United States Patent
Haruna et al.

(10) Patent No.: US 6,639,511 B2
(45) Date of Patent: Oct. 28, 2003

(54) ANTI-THEFT SYSTEM FOR VEHICLES HAVING REMOTE-CONTROLLED ENGINE STARTING FUNCTION

(75) Inventors: Katsutoshi Haruna, Obu (JP); Takeshi Kumazaki, Okazaki (JP); Toshio Shimomura, Chiryu (JP); Yoshinori Goto, Kariya (JP)

(73) Assignee: Denso Corporation, Kariya (JP)

( * ) Notice: Subject to any disclaimer, the term of this patent is extended or adjusted under 35 U.S.C. 154(b) by 107 days.

(21) Appl. No.: 09/897,064

(22) Filed: Jul. 3, 2001

(65) Prior Publication Data

US 2002/0003472 A1 Jan. 10, 2002

(30) Foreign Application Priority Data

Jul. 5, 2000 (JP) ...................................... 2000-203783

(51) Int. Cl.⁷ .............................................. B60R 25/10
(52) U.S. Cl. ............. 340/426.13; 340/539; 340/825.69; 340/825.72; 340/426.17; 307/10.1; 307/10.2
(58) Field of Search ............................. 340/426, 825.69, 340/825.72, 539, 426.17; 307/10.1, 10.2

(56) References Cited

U.S. PATENT DOCUMENTS

| | | | |
|---|---|---|---|
| 4,665,379 A | | 5/1987 | Howell et al. |
| 4,835,514 A | | 5/1989 | Masegi et al. |
| 4,897,630 A | * | 1/1990 | Nykerk .................. 340/426 |
| 5,612,669 A | | 3/1997 | Allen et al. |
| 5,648,754 A | | 7/1997 | Hwang |
| 5,673,017 A | * | 9/1997 | Dery et al. ............. 340/426 |
| 5,828,317 A | * | 10/1998 | Togashi .................. 340/825.69 |
| 5,900,806 A | | 5/1999 | Issa et al. |

FOREIGN PATENT DOCUMENTS

| | | |
|---|---|---|
| EP | 0 839 698 | 5/1998 |
| GB | 2 294 769 | 5/1996 |
| JP | A-11-139251 | 5/1999 |

* cited by examiner

Primary Examiner—Julie Lieu
(74) Attorney, Agent, or Firm—Posz & Bethards, PLC

(57) ABSTRACT

When starting an engine using its remote engine starter function in a guard mode, an engine control ECU outputs an engine status signal at H level prior to driving a starter motor. An anti-theft control device, upon reception of the signal, stores the engine operating status in a mode storage device and lower the detection sensitivity of sensors. This allows no false alarm to be generated, if the anti-theft system is initialized by the decreased voltage of battery at the time of driving the starter motor. In addition, the detection sensitivity of the sensors is low until the engine stops running, so that the sensors do not have risks torroneously detect the vibration of vehicle as an intruder.

13 Claims, 9 Drawing Sheets

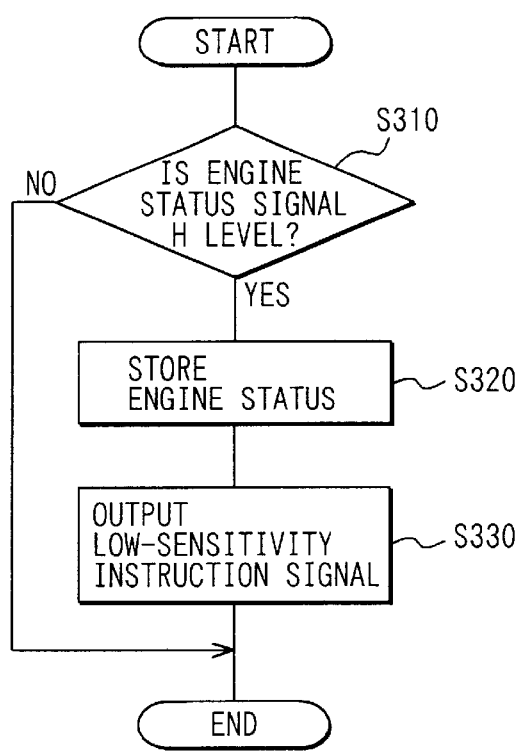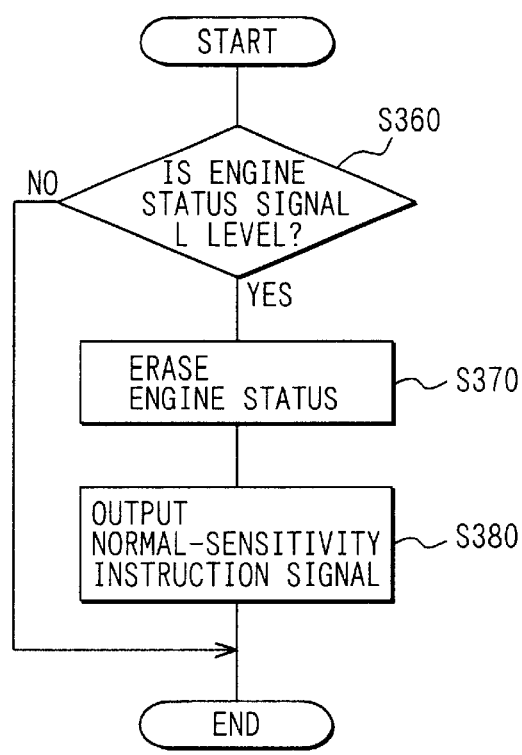

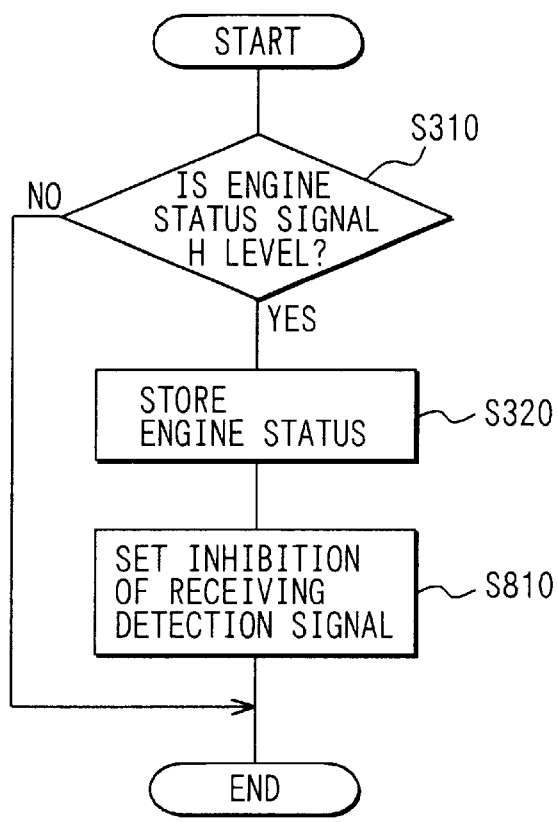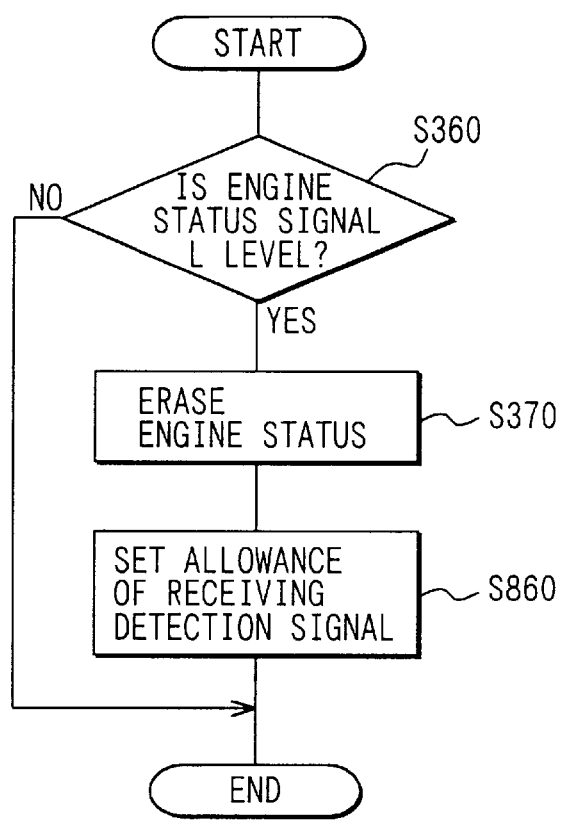

ANTI-THEFT SYSTEM FOR VEHICLES HAVING REMOTE-CONTROLLED ENGINE STARTING FUNCTION

CROSS REFERENCE TO RELATED APPLICATION

This application is based on and incorporates herein by reference Japanese Patent Applications No. 2000-203783 filed Jul. 5, 2000 and 2001-174166 filed Jun. 8, 2001.

BACKGROUND OF THE INVENTION

The present invention relates to an anti-theft system for vehicles, and more particularly to an anti-theft system for vehicles having a function of allowing starting of an engine by remote control.

Various types of anti-theft systems are known, for preventing vehicle thefts by any unauthorized operation including, for example, opening a door or a trunk lid with any illegal means other than the proper key.

Such an anti-theft system will enter into an anti-theft guard mode, when a user turns off the ignition switch, pulls the key out and then locks all doors. In the guard mode, any unauthorized operation is monitored. If an unauthorized operation is performed, the system enters into an alarm mode to sound a horn, and/or flash on and off hazard lamps. The guard mode is released only when the user unlocks the door with the proper key to enter a guard-free mode. Thus, a vehicle is in either one of the anti-theft (protection) modes, that is, the guard mode, the guard-free mode or the alarm mode.

However, the conventional anti-theft system is often set so as to enter from the guard mode into the alarm mode when the power supply has been once shut down and then recovered, other than the unauthorized operations. This is for causing the system in the guard mode to enter into the alarm mode, by determining an unauthorized removal of a battery by someone illegally, when the car battery is removed to stop operating the anti-theft system, and then is re-connected to start operating again the system.

That is, when the operation voltage supplied to the anti-theft system decreases below the lower limit voltage to be supplied for the system to operate, the anti-theft system stops operating. When the power is restored over the lower limit voltage to be supplied to the system, the system is re-initialized to start operating. In this case, the operation mode (protection mode) prior to stopping operation (prior to initialization) may be stored. When the system is initialized to start operating again, the operation mode is checked. If the operation mode prior to initialization is the guard-free mode, then the system will continue the guard-free mode. If the protection is the guard mode, then the system enters into the alarm mode to generate an alarm.

The cause of decrease of the operation voltage supplied to the anti-theft system is not limited to the removal of the battery. For example, cranking for starting the engine may cause a momentary voltage drop of the battery voltage below the lower limit value of the operation voltage. However the engine is started in the normal usage after the user uses the proper key to open the door to release the guard mode to the guard-free mode. If a momentary drop of battery voltage caused by starting the engine may result in an initialization of the anti-theft system, the guard-free mode is held because the operation mode before initialization is guard-free mode. Therefore, a voltage drop of the battery caused by cranking for starting the engine may not trigger the alarm mode.

However, in an anti-theft system, a user may use a remote engine starter to warm up the engine in advance, in such a manner as the user transmit data from a transmitter to warm up the engine from a remote place. The system may enter into the alarm mode, even though the operation is not a fraudulent action.

More specifically, when a user attempts to start the engine from a remote place with a remote engine starter device, the operation mode of the vehicle is in general the guard mode. In such a situation, if the user starts the engine with the remote engine starter, the battery voltage will hazardously decrease to initialize the anti-theft system. If initialized inadvertently, because the operation mode before initialization is in the guard mode, the anti-theft system enters into the alarm mode to generate an alarm when the battery voltage is restored to resume the operation of the anti-theft system. When the battery becomes weak, if the remote engine starter is used to start the engine, then the cranking until the engine completely starts running will result in a decrease of the operation voltage for the anti-theft system below the lower limit value. As a result, the anti-theft system will alarm each time the engine is started.

On the other hand, when a false alarm is triggered, a keyless entry system can be used to release the door lock, for example, to cause the anti-theft system to enter into the guard-free mode to stop the alarm. However, in this case the security may be lowered.

There are various types of unauthorized operations of the vehicle as well as various methods for detecting such operations. For example, for detecting an intruder attempting to intrude into the vehicle compartment by breaking a glass window, an intruder sensor is used in general by making use of ultrasonic or electromagnetic waves. Such an intruder sensor transmits ultrasonic or electromagnetic waves and measures the difference in frequencies between the transmission and the waves reflected from the object in the compartment. If the differential changes, an intruder is determined to be present. Such a sensor is affixed to for example the rear view mirror.

For detecting someone moving the vehicle by a towing truck (wrecker), an inclination sensor (e.g., a gyro sensor) is used for detecting the inclination of vehicle. This is because the vehicle is inclined when the towing truck raises an end part of the vehicle. The inclination sensor detects, based on the amount of inclination, that the vehicle is transported.

However, when the engine is started by using the remote engine starter device in the guard mode, the intruder sensor and inclination sensor may erroneously detect intruder or inclination, caused by factors including the vibration of vehicle due to the engine running, although no unauthorized operation has been made. During driving the starter motor immediately after starting the engine, the vibration of vehicle is large in particular. Thus, there is a large possibility of making a fault alarm.

When using an intruder sensor making use of ultrasonic waves, a false alarm may be triggered due to the air flow in the compartment by the air conditioner which is turned on when starting engine, for example, during the guard mode, other than the vibration of vehicle. In addition, the intruder sensor making use of electromagnetic waves may be jammed by the influence of surge noises generated at the time of driving the starter motor.

SUMMARY OF THE INVENTION

The present invention has an object to provide an anti-theft system for vehicles, which will not be triggered erroneously when no unauthorized action has been taken, at the time of starting an engine remotely by means of a remote engine starter device.

According to the present invention, an anti-theft system for vehicles is mounted on a vehicle having a remote starter control device for starting an engine in response to a turning-on instruction transmitted from an external transmitter. An operation mode of the system is set into either one of a guard mode and a guard-free mode in response to an operation of a user, and the operation mode is stored in an operation mode storage device. An alarm is generated outwardly, when an unauthorized operation of a vehicle is detected by an improper operation detection sensor under the condition that the operation mode is the guard mode.

The system determines whether the remote starter control device is operating and prevents the alarm if the remote starter control device is operating at the time of starting the system operation.

The system checks whether the remote starter control device is in operation and reduces detection sensitivity of the unauthorized operation sensor if the device is determined to be in operation.

The system checks whether the remote starter control device is in operation, and prevents the alarm if the unauthorized operation sensor detects the unauthorized operation under the condition that the remote engine starter control device is in operation.

BRIEF DESCRIPTION OF THE DRAWINGS

The above and other objects, features and advantages of the present invention become more apparent from the following detailed description made with reference to the accompanying drawings. In the drawings:

FIGS. 5A and 5B are flow diagrams illustrating an engine running status storing and erasing process performed in the first embodiment;

FIGS. 8A and 8B are flow diagrams illustrating a modification of the engine operating status storing and erasing process performed in the first embodiment;

DETAILED DESCRIPTION OF THE PREFERRED EMBODIMENT

The present invention will be described in further detail with reference to various embodiments.

[First Embodiment]

Figure 1:
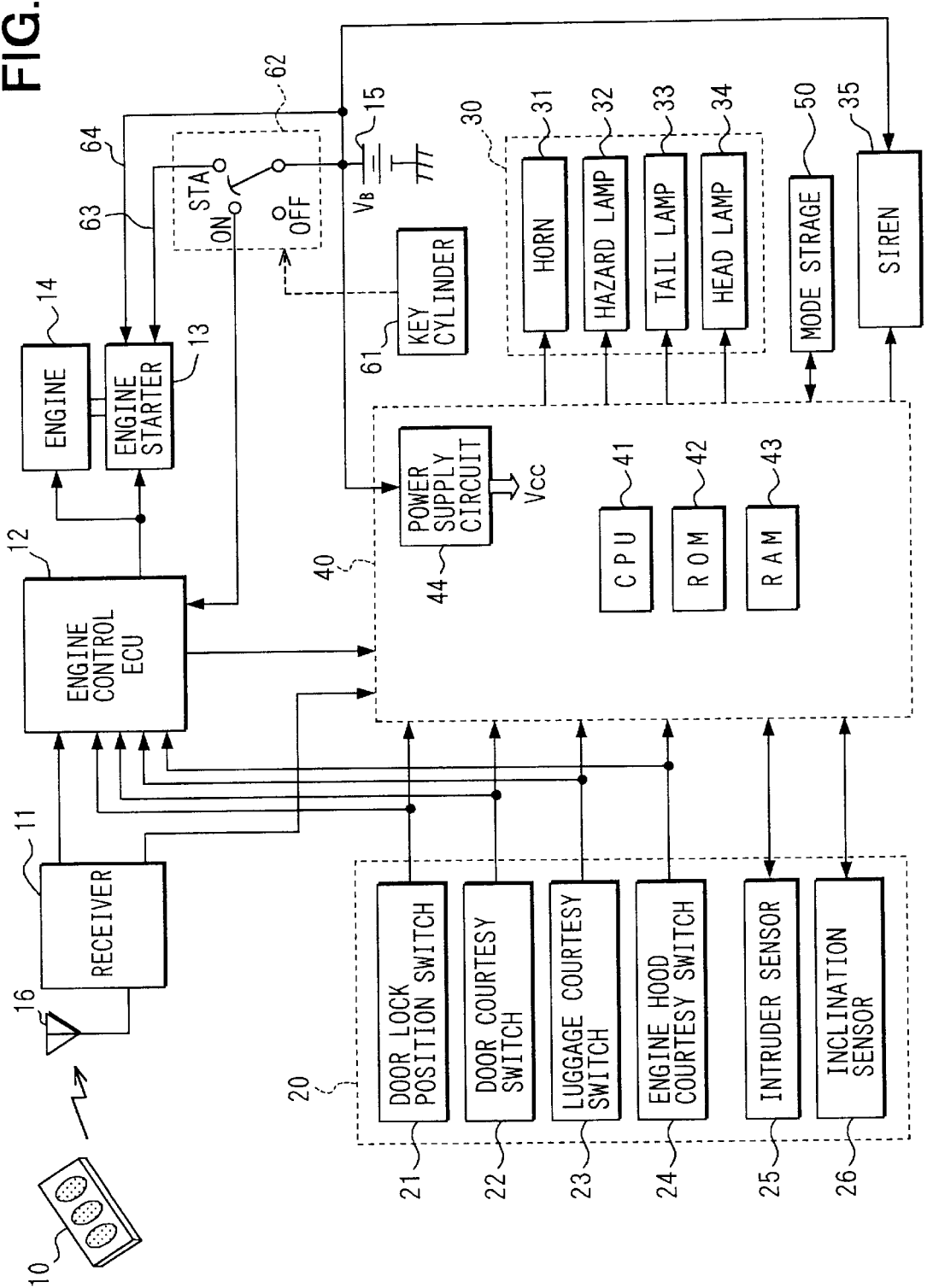
FIG. 1 is a schematic block diagram illustrating an anti-theft system for vehicles according to a first embodiment of the present invention.

Referring to FIG. 1, an anti-theft system for vehicles includes a receiver 11, an engine control ECU (electronic control unit) 12, an engine starter 13, a battery 15, a tamper detector device 20, an alarm device 30, an anti-theft control device 40, and an anti-theft mode (operation mode) storage device 50 as well as a siren 35.

The receiver 11 receives transmission data for starting the engine 14 from a portable transmitter 10 or transmission data for keyless entry through an antenna 16. The receiver 11 outputs data to the engine control ECU 12 if the data received is the transmission data for starting the engine. It also outputs data to the anti-theft control device 40 if the received data is the transmission data for keyless entry. The portable transmitter 10 is specifically built to use as the transmitter so as for the user to selectively transmit either data in order to open or close the door and to start the engine 14 of the vehicle from a remote place. The transmission data for starting the engine 14 may represent the starting instruction. More specifically, a vehicle equipping the anti-theft system may provide a capability of starting the engine by remote control (i.e., remote engine starter function) and a capability of opening and closing door locks by remote control (i.e., keyless entry function). The engine control ECU 12 is capable of controlling the engine 14 including the ignition timing control and the fuel injection amount control. The anti-theft control device 40 outputs always the engine status signal (digital signals of either L or H level) which indicates that the engine 14 is running or not.

With the engine control ECU 12, the anti-theft system may perform the remote engine starting process using the remote engine starter function, in addition to the ordinary engine control to output a starter driving command for starting the engine 14 to the engine starter 13 based on the engine starting transmission data received by the receiver 11, and to notify the anti-theft control device 40 that the engine 14 is running by raising to H level the engine status signal output to the anti-theft control device 40 at a timing earlier than the starter driving command. This timing is earlier by one clock cycle of the operating clock of a CPU (not shown) within the engine control ECU 12, for example. It may be a timing that at least step S320 in FIG. 5A can be performed appropriately prior to starting driving the engine starter 13.

It should be noted here that the engine control ECU 12 needs to output the starter driving command and raise the engine status signal to H level only when predetermined conditions are satisfied, instead of outputting unconditionally in response to the engine starting transmission data input from the receiver 11. More specifically, the engine control ECU 12 decodes the proper PIN code specific to the portable transmitter 10, included in the engine starting transmission data to check if thus decoded PIN code matches exactly with the PIN code previously stored in the non-volatile memory (not shown) in the engine control ECU 12. Thereafter, if matched, then the engine control ECU 12 distinguishes the engine starting transmission data as sent from a proper portable transmitter, to bring up the engine status signal to H level as well as to output a starter driving command. On the other hand, if not matched, then the engine control ECU 12 determines that the data received was sent from either a transmitter for another vehicle or an improper transmitter and discards the data.

Accordingly, the engine control ECU 12 performs the remote engine starting process, if and only if the PIN code matches properly. In addition, although the engine control ECU 12 also perform engine control in response to signals input from the tamper detector device 20, the details of the remote engine starting process is described later.

The engine starter 13 is a well known starter device for driving a crankshaft and the like to rotate in order to start the engine 14, which is driven by the electric power (battery voltage VB) supplied from the battery 15 used as the power supply.

In the normal operation, a user in the vehicle compartment inserts a key into a key cylinder 61 mounted around a steering wheel and swivels the key cylinder 61 to move the ignition switch 62 to the start position STA to supply electric power from the battery 15 to the engine starter 13 through the ignition switch 62 and a manual starter power supply line 63 to drive the engine starter 13.

On the other hand, for starting the engine 14 from a remote place by using the remote engine starting function, when the starter driving command is input from the engine control ECU 12 to the engine starter 13, a remote starter power switch (not shown) is turned on. This proper switch is mounted in the engine starter 13 and connected to a remote starter power supply line 64. That is, the remote starter power switch is turned off in the normal operation. However once the remote starter power switch is turned on by inputting the starter driving command, electric power from the battery 15 is supplied to the engine starter 13 to drive the engine starter 13.

The tamper detector device 20 is used not only for detecting the proper usage by the proper user, but also for detecting any unauthorized operation when a tampering action is taken on the vehicle. The device 20 includes door lock position switches 21, door courtesy switches 22, luggage courtesy switches 23, and engine compartment hood courtesy switch 24.

The door lock position switches 21 are used for detecting whether the door lock knobs provided on the front and rear doors of the vehicle one for each is positioned in either the locked or unlocked position. The signal indicative of the on or off state is output to the anti-theft control device 40.

The door courtesy switches 22, luggage courtesy switches 23, and engine compartment hood courtesy switch 24 are well known courtesy switches for automatically turning on and off lamps, when opening and closing the front doors and rear doors of the vehicle, the luggage door (trunk lid) of the vehicle, and the engine compartment hood (bonnet), respectively. The signals indicative of the on or off states of these switches are output to the anti-theft control device 40. Thus, for example, when the luggage door is opened, a signal indicating that the luggage door is open is input to the anti-theft control device 40 from the luggage courtesy switches 23.

Four switches 21 to 24 are for use not only in detection of improper action on the vehicle but also in various controls of the vehicle. The signals from these four switches 21 to 24 are input to other ECUs such as the engine control ECU 12 and body ECU (not shown).

The intruder sensor 25 and inclination sensor 26 are sensors used solely in the anti-theft system for vehicles and detection signals therefrom are thus input to the anti-theft control device 40.

The intruder sensor 25 for detecting an intruder intruding into the compartment uses ultrasonic waves and may be mounted on the rear view mirror in the compartment. The inclination sensor 26 uses a known gyro sensor and the like for measuring the angle and acceleration of object. For example, the inclination sensor 26 detects inclination if the vehicle is inclined more than a predetermined angle when an end of the vehicle is raised by a towing truck.

Figure 2:
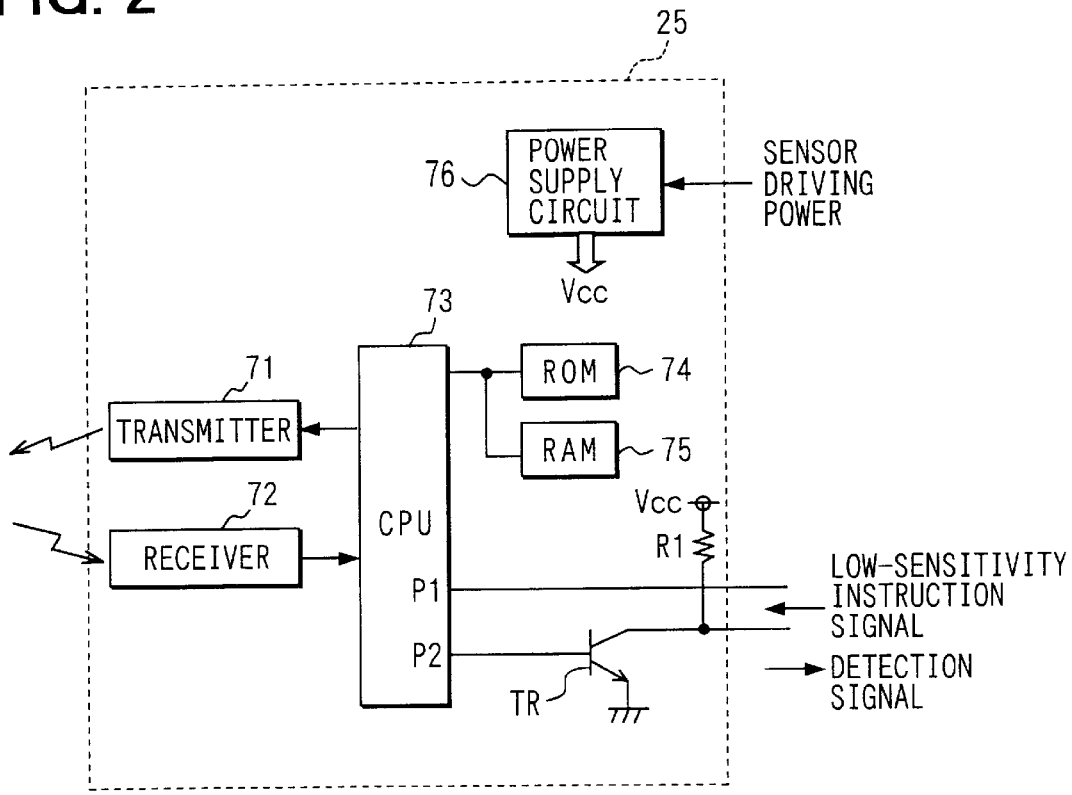
FIG. 2 is a schematic block diagram illustrating an intruder sensor used in the first embodiment.

As shown in FIG. 2, the intruder sensor 25 includes a microcomputer having a CPU 73, ROM 74, RAM 75 and so on. A transmitter 71 based on the instruction from the CPU 73 emits predetermined ultrasonic waves, which is reflected by a given object in the compartment and returned to the sensor, received by a receiver 72 to input to the CPU 73.

The CPU 73 is operated by the power supplied from a power supply circuit 76, to compute the differential frequency of ultrasonic waves between the transmission from the transmitter 71 and the reception to the receiver 72. Then it will compare the difference f with a predefined reference fTH to determine no intruder if the difference ($\Delta f=|f-fTH|$) is less than the predefined maximum tolerance (S) or determine an intruder (anomaly) if the difference exceeds this tolerance S.

L level signal is fed to the base of a transistor TR from the port P2 of the CPU 73 in the normal operation. The collector of the transistor TR is applied with the power supply voltage Vcc from the power supply circuit 76 via a pull-up resistor RI. The collector potential in the normal operation is equal to Vcc (H level), and thus H level signal is output to the anti-theft control device 40. However, the CPU 73, when detecting an intruder, outputs H level signal to the base of the transistor TR to turn on the transistor TR. The collector of the transistor TR thereby is pulled down to the ground potential (L level). Thus L level signal is output to the anti-theft control device 40 as the detection signal indicative of the intruder.

The anti-theft system is able to output low-sensitivity instruction signal (pulsed signal) from the anti-theft control device 40 to the intruder sensor 25 to reduce the detection sensitivity of the intruder sensor 25, and output normal-sensitivity instruction signal (pulsed signal) to the intruder sensor 25 to restore the intruder sensor 25 to the normal sensitivity the intruder sensor 25.

More specifically, the anti-theft control device 40 outputs a pulsed signal, which is input to a port P1 of the CPU 73. If the input pulse signal is the low-sensitivity instruction, then the CPU 73 increases the maximum tolerance S. By increasing the maximum tolerance S in this manner, the detection sensitivity of the intruder sensor 25 can be accordingly decreased. On the contrary, if the input pulse signal is the normal-detection sensitivity instruction, then the CPU 73 decreases the maximum tolerance S to the value prior to increase.

The ROM 74 stores a program for executing the processes by the CPU 73. The power supply circuit 76, which is supplied with the sensor driving power from the anti-theft control device 40, converts the sensor driving power appropriately to feed power to components in the intruder sensor 25. However, it should be noted that the supply of sensor driving power from the anti-theft control device 40 is only when the operation mode of the vehicle is the guard mode. The intruder sensor 25 thus operates only in the guard mode, and does not operate in other modes, for example, when the proper user drives the car.

The inclination sensor 26 also has a microcomputer in a manner similar to intruder sensor 25. It operates with the sensor driving power supplied from the anti-theft control device 40 to output the L level detection signal to the anti-theft control device 40, when the inclination of the vehicle exceeds a predetermined angle θ by determining the presence of an improper action.

The detection sensitivity of the inclination sensor 26 as similar to the intruder sensor 25 can be decreased by the low-sensitivity instruction signal supplied from the anti-theft control device 40, as well as restored to the normal sensitivity level by the normal-sensitivity instruction signal. More specifically, the decreased detection sensitivity can be implemented by increasing the given angle θ above to a value larger than normal.

The alarm device 30 is used for alarming outward that an improper action is being taken when the tamper detector device 20 detects any unauthorized tampering action on the vehicle such as picking a door by a person other than the proper user. It includes a horn 31, hazard lamps 32, tail lamps 33, and head lamps 34. When an unauthorized action is taken on the vehicle, the alarm device 30 alarms outward for example by intermittently sounding the horn 31, flickering the hazard lamps 32, turning on or intermittently turning on and off the tail lamps 33 and head lamps 34.

The anti-theft control device 40 is primarily comprised of a microcomputer, including a CPU 41, ROM 42, RAM 43, a power supply circuit 44 and the like, for performing anti-theft management process for controlling the operation of the alarm device 30 on the basis of the signals input from the switches 21 to 24 of the tamper detector device 20, and detection signals input from the sensors 25 and 26 of the tamper detector device 20, as well as the operation mode of the vehicle (more precisely, the operation mode of the anti-theft system for vehicles) stored in the mode storage device 50. The anti-theft management process is described in greater details herein below.

The anti-theft control device 40, in response to the engine running status signal input from the engine control ECU 12, stores the running status into the mode storage device 50.

The anti-theft control device 40, in addition, decodes the PIN code specific to the portable transmitter 10 included in the keyless entry transmission data input from the receiver 11 and reads out the PIN code previously stored in the mode storage device 50 to check if the PIN code matches exactly. If matched, then it will distinguish the keyless entry transmission data as sent from the proper, authorized portable transmitter to activate the door lock mechanism (not shown) to open or close the door lock. If otherwise not matched, then the device 40 determines that data received was sent from either a transmitter for another vehicle or an improper transmitter and discard the data.

The anti-theft control device 40 normally operates with a predetermined operating voltage Vcc (for example, 6 volts) converted by the power supply circuit 44 from the voltage VB of the battery 15 (for example, 12 volts) to supply to components including the CPU 41. Accordingly, as long as the battery 15 is connected, the anti-theft control device 40 continues to operate with the power supplied from the battery 15. on the other hand, it stops operating when the battery 15 is removed or the electric power voltage VB from the battery 15 drops down.

Next time the battery voltage VB is fed thereto and when the anti-theft control device 40 is initialized to resume operation, the anti-theft control device 40 refers to the operation mode stored in the mode storage device 50, and may or may not activate the alarm device 30 to generate an alarm depending on the result of storage.

The mode storage device 50 is comprised of a well known non-volatile memory such as EEPROM and the like for storing the engine running status and for storing the PIN code used for opening and closing the door locks in the keyless entry function, as well as for storing whether the vehicle is at present in either of three operation modes, i.e., guard mode, guard-free mode or alarm mode. The operation mode corresponds to the operation status.

In this embodiment, a vehicle is normally in either one of three operation modes, and the transition between modes is controlled by the anti-theft control device 40. However, the operation mode is stored in the mode storage device 50.

It should be noted that the guard mode designates a status that an unauthorized action can be detected to allow generating an alarm if the action is taken. For example, a vehicle may enter into the guard mode when the user finishes driving and gets off the vehicle to lock all doors. When in the guard mode, if an intruder picks a door by force, for example, a signal indicating that a door has been opened is sent from the door courtesy switch 22 to the anti-theft control device 40 so that the operation mode thereby changes to the alarm mode to generate an alarm using a predetermined alarming means (for example sounding the horn 31) from the alarm device 30. The alarm mode designates a status that an alarm is activated by the alarm device 30. The operation mode transits to the alarm mode, if the tamper detector device 20 detects an unauthorized action taken in the guard mode. In the guard mode or in the alarm mode, if the proper user releases the door lock with the proper procedure, the operation mode changes to the guard-free mode. The guard-free mode designates a status that the user performs normal operations, such as opening and closing the door lock with the proper key operation and starting the engine.

The anti-theft system further includes the siren 35, as a means for reporting an improper action taken by someone to the nearby people, in addition to the alarm device 30. The siren 35 is equipped for sounding an alarm when the battery 15 is removed, that is, the power supply line from the battery 15 to any part of the vehicle is cut by someone.

Figure 3:
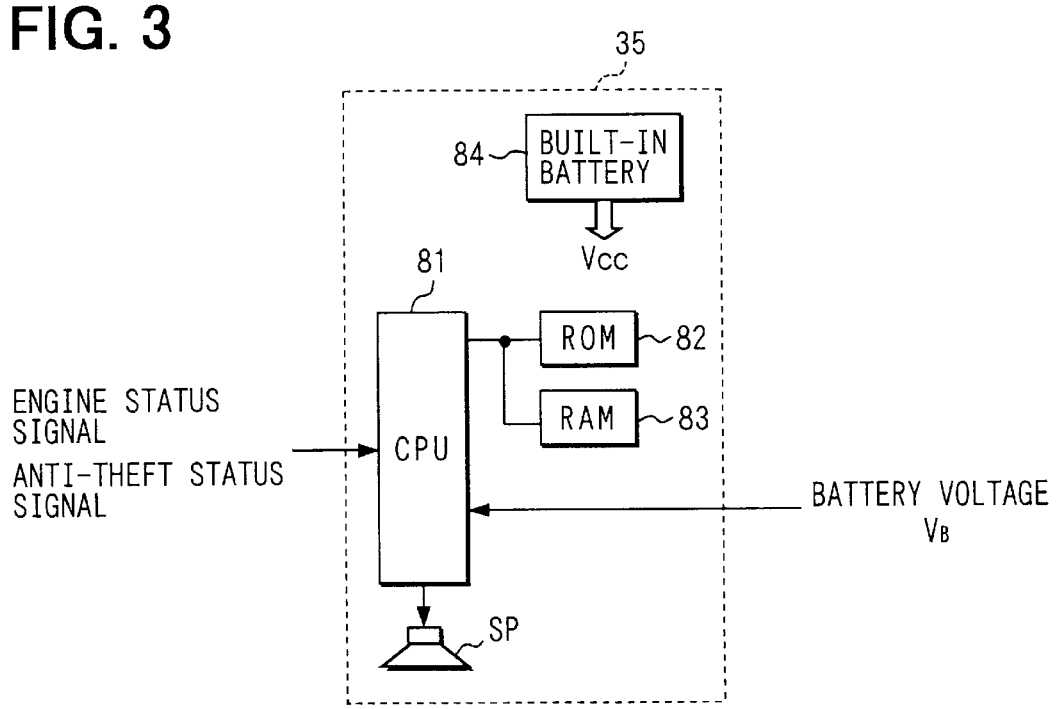
FIG. 3 is a schematic block diagram illustrating a siren used in the first embodiment.

As shown in FIG. 3, the siren 35 is comprised of a microcomputer including a CPU 81, ROM 82, RAM 83 and the like and operates using a built-in battery 84 which is a built-in auxiliary power supply. The CPU 81 receives, through I/O interfaces (not shown), the operation mode signal from the anti-theft control device 40 indicative of the current operation mode, and the engine status signal from the engine control ECU 12 through the anti-theft control device 40 as well as the battery voltage VB from the battery 15.

When the battery voltage VB fed to the CPU 81 falls below a predetermined threshold voltage, caused by for example the removal of the battery 15, loud alert sound is emitted from the loudspeaker SP.

Figure 4:
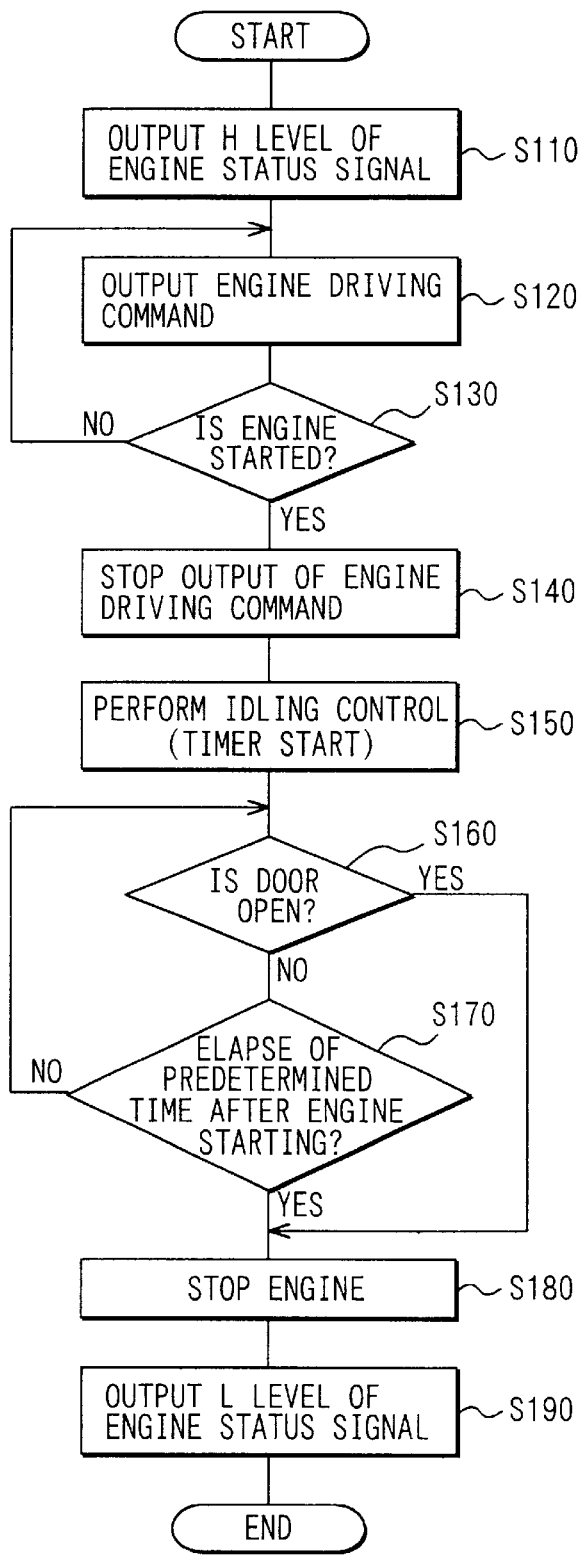
FIG. 4 is a flow diagram illustrating a remote engine start process performed in the first embodiment.

The operation of the anti-theft system is described in greater details below with reference to FIG. 4 along with programmed processes. The remote engine start process is performed in the engine control ECU 12 when starting the engine 14 using the remote engine starter function. That is, the system receives the transmission data for starting the engine, and determines that the received data is sent from the proper portable transmitter 10.

When the process begins, at step (S) 110, the engine status signal output from the engine control ECU 12 to the anti-theft control device 40 is brought to H level (L level when the engine is stopped). This indicates the anti-theft control device 40 that the engine 14 is going to start. The engine status signal in H level is output continuously as long as the engine is running, even when the engine 14 is completely started and the engine starter 13 stops.

The process proceeds to S120, where a starter driving command is output to the engine starter 13. Thereby the engine starter 13 is driven to start the engine 14. The process proceeds to S130, where it is checked whether the engine 14 is completely started to run. The determination is made based on for example an engine speed. If the engine is not yet running completely then the process goes back to S120 to continue to output the starter driving command. Otherwise if the engine is determined to be running, then the process goes to S140 to stop outputting the starter driving command. At this point since the engine 14 is completely running, the process proceeds to S150 to perform idling control of normal operation to adjust the engine speed to a predetermined idling speed. At this time a timer (not shown) may be started to count the elapsed time after the engine has been completely started.

The process then proceeds to S160 to determine whether a door of the vehicle is open or not. More specifically, the process checks whether the door lock is locked or unlocked and whether the doors are open or closed, based on the signals sent for example from the switches 21 to 24 of the tamper detector device 20. If all doors are closed, then the process proceeds to S170 to check whether a predetermined period of time (for example, 5 minutes) has elapsed after starting the engine based on the timer started at S150. If the predetermined period of time has not yet elapsed, then the process goes back to S160. If the predetermined time has elapsed already, then the process goes to S180 to stop the engine 14. The process thereafter goes to S190 to set the engine status signal output to the anti-theft control device 40 to L level.

At S160, if determined that a door is still open, for example, because an unauthorized action has been taken to pick the door, or because the user has released the door lock with the proper procedure, the process proceeds to S180 to stop the engine 14. The process then proceeds to S190. Thus, when starting the engine with the remote engine starter function, the engine 14 is stopped if any door is open, notwithstanding by a proper procedure or by an unauthorized action.

When attempting to start the engine 14 with the remote engine starter function, the engine status signal output from the engine control ECU 12 to the anti-theft control device 40 is set to H level, prior to driving the starter 13, while the signal is set to L level at the time when the engine 14 stops. Then the anti-theft control device 40 based on this engine status signal performs processes shown in FIGS. 5A and 5B illustrating the storage and erase operation of engine running status, performed by the anti-theft control device 40. FIG. 5A is a flow diagram illustrating the engine running status storing process performed when the protection is the guard mode. FIG. 5B is a flow diagram illustrating the engine running status erasure process performed in any operation modes.

The process of engine running status storing shown in FIG. 5A is performed when the operation mode is the guard mode. More specifically, the process is performed as a part of the guard mode process S500 in the anti-theft management process shown in FIG. 6. When this process starts, at S310, the engine status signal is checked whether it is at H or L level. If the engine 14 is still stopped and the signal is L level, the process is terminated. Otherwise if the signal goes to H level because the engine starts, the process proceeds to S320, where the engine running status is stored in the mode storage device 50.

Figure 6:
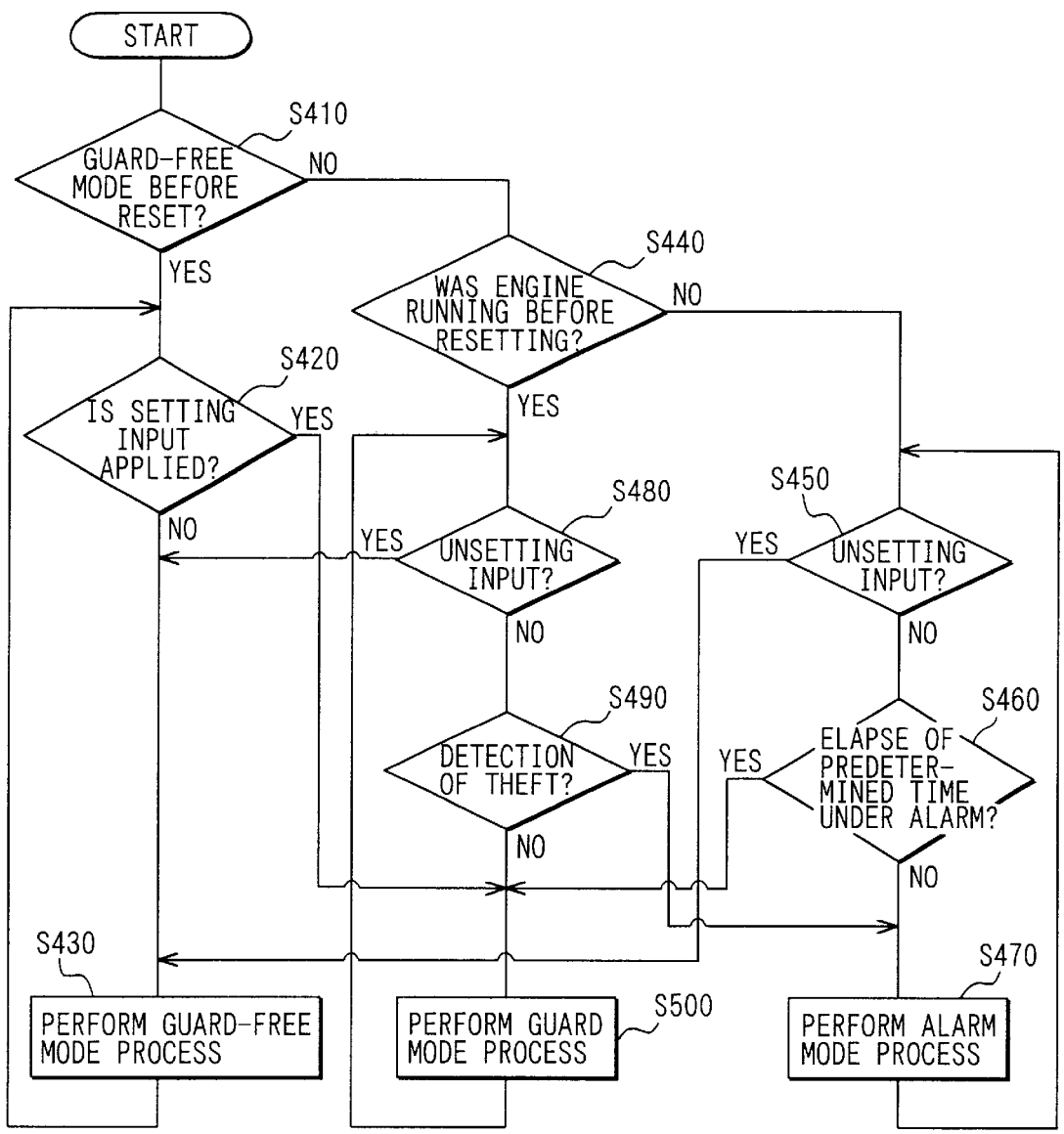
FIG. 6 is a flow diagram illustrating an anti-theft management process performed in the first embodiment.

At step S330, the low-sensitivity instruction signal for reducing the detection sensitivity is output to the intruder sensor 25 and to the inclination sensor 26, and then the process is terminated. This process is repeated during the guard mode, each time the process S500 shown in FIG. 6 is performed.

Next, the engine running status erasure process shown in FIG. 5B is performed regardless of the operation mode. More specifically, it is performed as a part of processes including the guard-free process at S430, guard mode process at S500, and alarm mode process S470, in the anti-theft management process shown in FIG. 6. Once this process begins, at S360, the engine status signal is checked whether it is at L level or not. If the engine 14 is still running and the signal is H level, then the process S360 is repeated. However, when the signal goes to L level, because the engine stops, then the process goes to S370, where the storage contents stored in the mode storage device 50 that the engine is running is erased.

At step S380, the normal-sensitivity instruction signal is output to the intruder sensor 25 and to the inclination sensor 26 to restore the sensitivity to terminate this process. It is to be understood that the intruder sensor 25 and the inclination sensor 26 may operate only in the guard mode. The intruder sensor 25 and the inclination sensor 26 are not supplied with the sensor driving power from the anti-theft control device 40 in the alarm mode or the guard-free mode, although the normal detection sensitivity is instructed. This process is repeated, each time the steps S430, S500, or S470 shown in FIG. 6 is performed.

The anti-theft control device 40 stores in the mode storage device 50 the status indicating that the engine is running, prior to start driving the starter 13, when in the guard mode the engine control ECU 12 inputs the engine status signal of H level to use the remote engine starter function to start the engine, and to decrease the sensitivity of those sensors 25 and 26. The memory content that indicates the engine is running is held during the period of time when the engine status signal at H level is input from the engine control ECU 12.

Since the mode storage device 50 is comprised of a non-volatile memory such as EEPROM, even though the anti-theft control device 40 is by accident reset due to the voltage drop of the battery, the storage content indicating that the engine is running is held as is stored before reset.

The anti-theft management process performed in the anti-theft control device 40 is described in greater details herein below. The CPU 41 is first initialized (reset) prior to start processing, while at the same time the anti-theft management program is read out from the ROM 42 to perform processing according to the program.

The CPU 41 is reset for example when the battery is connected in the production line for the first time to start the operation, or when the battery is removed once for the inspection and the like and then reconnected or changed. In the normal operation, the CPU 41 which is connected to the battery 15 all the time does not have the opportunity of reset. However, when driving the starter 13 for starting the engine, it is possible that the battery voltage VB may abruptly fall during driving the starter motor, in particular when the battery 15 becomes weaker. If the voltage VB of the battery 15 decreases due to the cranking when starting the engine 14 with the starter 13 and if the voltage Vcc supplied to the CPU 41 consequently decreases below the lower limit value of the operation of the CPU 41 (for example 3 to 4 volts), then the CPU 41 stop operating. When the battery voltage VB is restored again and the voltage Vcc supplied to the CPU 41 rises above the lower limit value of the operable voltage range of the CPU 41, then the CPU 41 is initialized and restarted. Accordingly the anti-theft control device 40 re-starts.

In FIG. 6 illustrating the anti-theft management process, when the process begins, at S410, the operation mode before resetting is checked whether it is the guard-free mode or not. For example, if the reset is caused by the removal and re-installation of the battery 15 by the proper user following the proper procedure to open the hood (bonnet), or when the reset is caused by a momentary disruption of the battery voltage VB by the cranking for starting the engine 14 with the proper key, the status before resetting is the guard-free mode, which is stored in the mode storage device 50. If the status before resetting is determined to be the guard-free mode by reading out the status stored in the mode storage device 50, the status is acknowledged at S410 and the process proceeds to S420.

At S420, it is checked whether or not an action for transiting to the guard mode (setting input) has been taken. In the preferred embodiment, the setting input may be taken in case in which the proper key operation, or the proper keyless entry action locks all of the doors, and that the luggage lid as well as the bonnet are closed. If setting input is not yet entered because for example the user does not yet lock the door and the like, the process proceeds to S430 to perform the guard-free process. In this step 430 the protection is stored in the mode storage device 50 as the guard-free mode. The engine running status erasure process (FIG. 5B) and so on are performed before continuing the process after S420. Then, when the setting input is entered for example by the user locking all doors, the process is acknowledged at S420 to proceed to S500.

At S500, the guard mode process is performed. In the guard mode process, the operation mode is stored in the mode storage device 50 as the guard mode, while the engine running status erasure process (FIG. 5B) as well as the engine running status storing process (FIG. 5A) is performed.

If the mode before resetting is guard-free, then the guard-free mode continues after resetting. The mode transits to guard mode only when the setting input is entered.

If the status is determined negatively at S410, that is, if the status before resetting is the guard mode or the alarm mode, then the process proceeds to S440. The fact that the device is reset during the guard mode or alarm mode indicates that it is highly probable that the system has been reset by an unauthorized action such as the removal of battery while the user is absent. However, it may also be possible that the reset is done by cranking for starting the engine if the user attempts to start the engine 14 with the remote engine starter. Therefore it may not necessarily be an unauthorized tampering action.

Then, the process does not transit immediately to the alarm mode. Rather it checks first at S440 whether the engine 14 was running before resetting. At this time the content stored in the mode storage device 50 is read out to check whether the stored content is indicative of the engine running status. If the engine 14 has been stopped before resetting, indicating that the engine running status erasure process as shown in FIG. 5B has been already performed and that the mode storage device 50 does not store the status that the engine is running, then at S440 the it is determined to be negative to proceed to S450.

At S450, it is checked whether the operation to transit to the guard-free mode (unsetting input) has been done, for example, whether the user releases the door lock with the proper key operation or the key operation of the keyless entry function. If no unsetting input is present, then the process proceeds to S460. At S460, it is checked whether a predetermined period of time (for example, 30 seconds) has elapsed in the alarm mode. At this point since the process just starts operating by resetting, the process branches to S470.

At S470, the alarm mode process is performed. In the alarm mode process the operation mode is set as the alarm mode to the mode storage device 50 to activate the alarm device 30 to generate an alarm. More specifically, if the system has been reset without starting the engine 14, then it is determined that an unauthorized action has been taken so as to generate an alarm accordingly. The engine running status erasure process (FIG. 5B) and other processes are also performed.

Thereafter, the processes after S450 is repeated so as to repeat the alarm mode process in succession to continue to generate the alarm unless the user enters the unsetting input. However, if the user enters the unsetting input during the alarm mode, then it is determined at S450 to be affirmative. The process proceeds to S430 to perform the guard-free mode process to transit to the guard-free mode. More specifically, the fact that there is an unset input indicates that the user has performed the proper action (such as releasing the door lock). Thus continuously generating the alarm is unnecessary. If otherwise there is not an unset input, when a predetermined period of time (30 seconds) has elapsed in the alarm mode, then it is determined to be affirmative at S460. The process proceeds to S500 to perform the guard mode process to transit to the guard mode. This is because the battery 15 is weak if the horn 31 sounds unlimitedly and continuously so that ultimately starting the engine with the proper key operation may become difficult.

On the other hand, at S440, it is checked whether the engine 14 was running before resetting or not. If the engine was running before resetting while the mode storage device 50 stores the status that the engine is running, the process proceeds to S480. Another possible case that affirmative determination at S440 may otherwise occur is that the user started the engine 14 by sending the engine starting transmission data from the portable transmitter 10 in the guard mode to cause the engine running status storage process shown in FIG. 5A to be performed and thereafter the CPU 31 has been reset due to a transient (momentary) fall of the battery voltage by cranking to start the engine. In this context, the process at S330 in FIG. 5A decreases the detection sensitivity of the sensors 25 and 26.

At S480, in a manner similar to S450, it is checked whether there is an unset input. If no unset input is present, then the process proceeds to S490. At S490, it is checked whether a theft has been detected or not, that is, whether any unauthorized action has been taken by checking the signals sent from switches 21 to 24 of the tamper detector device 20 and from the sensors 25 and 26. For example, S490 checks whether the signal indicating that the door is open is output from the door courtesy switches 22, or whether the signal indicating that the hood is open is output from the engine compartment hood courtesy switch 24, or whether the detection signal is sent from the intruder sensor 25.

In this situation, the detection by those sensors 25 and 26 is in low detection sensitivity, allowing the sensors 25 and 26 not to erroneously detect an improper action, in consequence of the vibration of vehicle and electromagnetic noises caused by the running engine 14 and the air flow in the compartment.

If no unauthorized action has been detected, then the process proceeds to S500 to perform the guard mode process. Thereafter the process repeats the steps after S480. If the unset input is given from the user, then the process proceeds from S480 to S430 to perform the guard-free mode process to transit to the guard-free mode. If any unauthorized action has been detected by the tamper detector device 20, then it is determined that the vehicle has been stolen and the process proceeds to S470 to perform the alarm mode process S500 to transit to the alarm mode.

Although not shown in FIG. 6, if no protection status is stored in the mode storage device 50 when starting operation after a reset, in such a case as the battery 15 is connected for the first time in the production line, the protection goes provisionally to the guard-free mode (that is, the process at S430 is performed).

Figure 7:
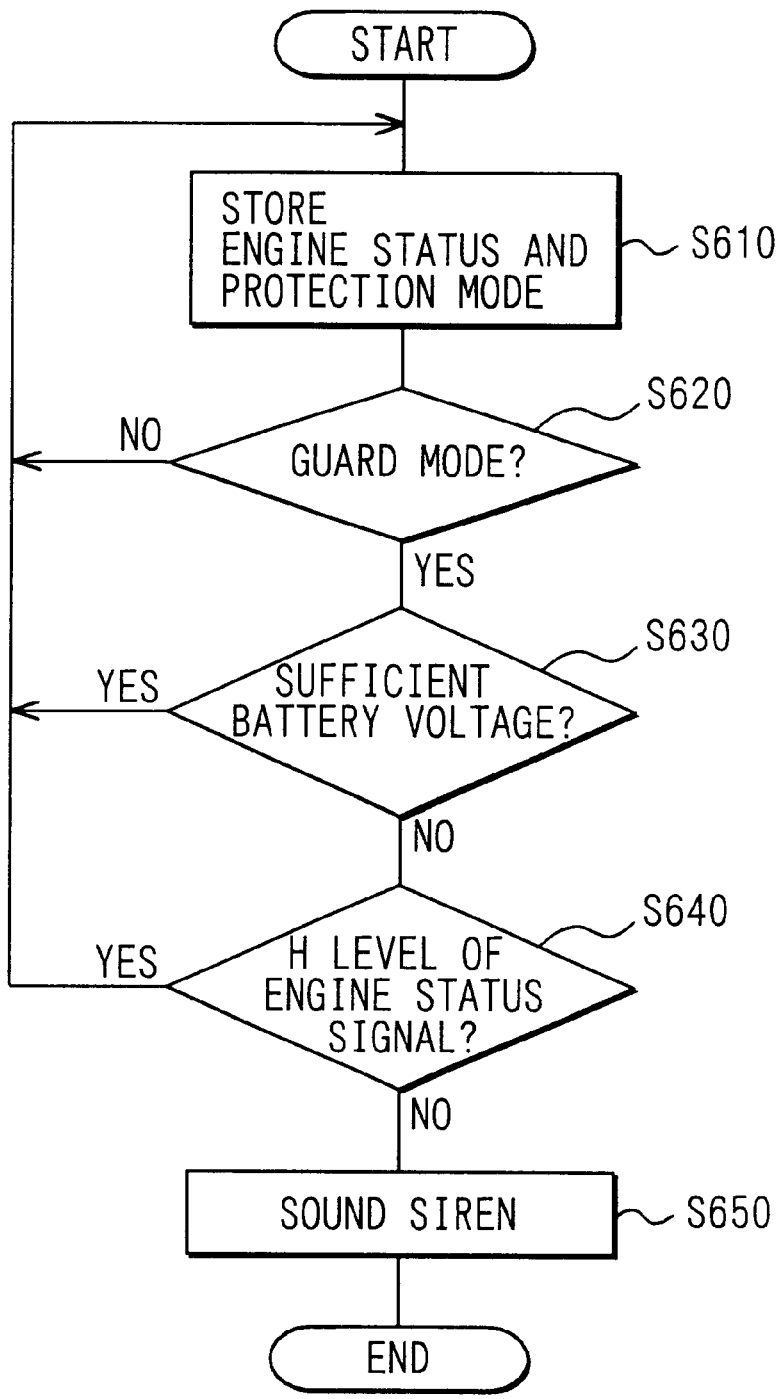
FIG. 7 is a flow diagram illustrating an alarm sound generating process performed in the first embodiment.

FIG. 7 is a flow diagram illustrating an alert sound generating process performed by the CPU 81 of the siren 35. The CPU 81 performs this process on the basis of the program of alert sound generating process stored in the ROM 82.

As shown in FIG. 7, at step S610, the running status of the engine 14 and the operation mode of the vehicle are once stored in the RAM 83. The CPU 81 may have the operation mode signals indicative of the current operation mode input from the anti-theft control device 40, and the engine running status signal of H level input from the engine control ECU 12 via the anti-theft control device 40, at the time when trying to start the engine 14 by means of the remote engine starter function (that is, at the time when the transmission data for starting the engine sent from the portable transmitter 10 is input into the engine control ECU 12) prior to starting driving the starter 13. Those signals thus input is stored in the RAM 83.

At the succeeding step S620, the operation mode of the vehicle is checked whether the mode is the guard mode, based on the memory contents of the RAM 83. If not in the guard mode, then the program goes back to step S610. If in the guard mode, then the program proceeds to step S630. At step S630, the battery voltage VB is checked to see whether it is less than a predetermined voltage. If the voltage is sufficient, then the step determines that no improper action has been taken specifically onto the battery 15 and goes back to step S610. Otherwise, if the voltage is insufficient, then the program infers that the battery 15 may have been possibly removed by someone and the program proceeds to step S640.

At step S640, the running status of the engine 14 is checked on the basis of the memory contents of the RAM 83. If the memory stores that the engine is running, then the program infers that the voltage drop may be possibly momentary at the time of starting the engine 14 and not caused by any improper action. Thus the program proceeds to step S610. If otherwise the engine is not running, then the program infers an improper action taken, and goes to step S650 to sound an alert sound from the loudspeaker SP.

As can be appreciated from the foregoing detailed description, if the operation mode before resetting is the guard mode or the alarm mode and the status is not engine running, then it can be presumed that any unauthorized action such as the removal of battery 15 has been taken. The process may proceed from S440 to S450 in order to perform the alarm mode operation. However, if the protection before a reset is the guard mode or alarm mode and additionally the status is engine running, then it may be presumed that the status is caused by the voltage drop of the battery 15 when the user uses the remote engine starter function to start the engine 14. The process proceeds from S440 to S480 such that the protection will continue to stay in the guard mode, instead of going to the alarm mode.

When in the guard mode the remote engine starter function is used to attempt to start the engine 14, the engine status signal of H level is output while the detection sensitivity of the sensors 25 and 26 is decreased, prior to driving the engine starter 13. Then, the output of the engine status signal at H level and the decreased detection sensitivity is continuously held, until the engine 14 stops, even after driving the starter 13 and when the engine has been completely started running.

In accordance with the anti-theft system of this embodiment, at the time of initialization, the protection before resetting is checked whether it is in the guard mode or alarm mode. At the same time, the engine 14 is checked whether running or not by using the remote engine starter function. Even though the protection before resetting is the guard mode, the alarm device 30 is prevented from activating if the engine 14 is running. Therefore, when attempting to start the engine 14 from a remote place while in the guard mode, if the battery voltage drops by cranking during driving the engine starter 13 with the remote engine starter function to cause the anti-theft control device 40 to be reset, an erroneous alarm is prevented from being generated.

Instead of determining that the engine is starting with the remote engine starter function by directly checking the engine status signal sent from the engine control ECU 12, the engine status is determined by checking whether the engine running status is stored in the mode storage device 50 or not. Thus, the engine running status is set in the mode storage device 50 once the engine status signal of H level is detected. The storage content is retained unless an erase operation is explicitly instructed (engine status signal of L level). As a result, by examining the storage contents of the mode storage device 50 when restarting the anti-theft control device 40 after a reset, the status of the engine 14 before the reset can be positively defined. Thus, there is no risk of making an erroneous determination on the engine status, resulting from the fact that the engine status signal have not been successfully received immediately after starting the engine. Thus, preventing any erroneous alarm from being generated is ensured.

Furthermore, the storage content that the engine is running is held after the engine 14 is completely started and not deleted until the engine 14 is stopped. If jamming electromagnetic noises after the engine 14 is completely started causes the anti-theft control device 40 to be reset, no erroneous alarm is generated by hazard since the status before resetting (that the engine was running) is stored once examining the contents of the mode storage device 50 at the time of restart. Thus a more reliable anti-theft system is provided.

In addition, during the period of time when the engine 14 starts and then stops by using the remote engine starter function in the guard mode, there will not be risks that the sensors 25 and 26 may be deceived by the vibration of vehicle and electromagnetic noises caused by the driven starter 13 or ordinary idling of the engine 14, and the air flow in the compartment since the detection sensitivity of the sensors 25 and 26 is lowered.

Furthermore, the siren 35 does not produce an alarm sound if the engine 14 is running by the remote engine starter function, even if the battery voltage VB fed from the battery is lowered below the predetermined voltage threshold value due to an improper action such as the removal of battery. Thus, it is not likely that the alarm sound may be falsely produced due to the decrease of the battery voltage VB at the time of driving the engine starter 13.

The above first embodiment may be modified as follows. For instance, to prevent incorrect detection by the sensors 25 and 26 at the time of starting the engine 14 by means the remote engine starter function in the guard mode, the detection sensitivity of sensors 25 and 26 may be lowered in the period of time from the moment of starting the engine 14 by the remote engine starter function to the moment of stopping the engine 14. The anti-theft control device 40 may be arranged so as not to receive the detection signals arriving from the sensors 25 and 26 instead of decreasing the detection sensitivity of sensors 25 and 26.

To do this, the engine operating status storage process to be performed in the guard mode, shown in FIG. 5A (more specifically, performed as a part of guard mode process of S500 in the anti-theft management process shown in FIG. 6) may be modified to the process shown in FIG. 8A. In addition, the engine operating status erasing process performed in all operation mode, shown in FIG. 5B (more specifically, performed as part of process steps S430, S470, and S500 in the anti-theft management process of FIG. 6) may also be modified to the process shown in FIG. 8B.

More specifically, the process steps shown in FIG. 8A are partly identical to those shown in FIG. 5A in the range of S310 to S320. However, after S320, the detection signal from the sensors 25 and 26 is inhibited to be received (S810), instead of outputting the low-sensitivity instruction signal to the sensors 25 and 26. Furthermore, the process steps shown in FIG. 8B are partly identical to those shown in FIG. 5B in the range of S360 to S370. However, after S370, the detection signal from the sensors 25 and 26 is allowed to be received at S860 so as to restore to the normal condition (alert on an improper action if the detection signal is present) instead of outputting the normal-sensitivity instruction signals to the sensors 25 and 26.

However, in such a case, the process step S490 in the anti-theft management process of FIG. 6, an improper action may not be determined solely with the presence of the detection signals from the sensors 25 and 26 (to transit to step S470). Further determination needs to be done whether or not the reception of detection signals at that time is allowed. That is, the process may proceed to the alarm process of S470 when the detection signals from the sensors 25 and 26 arrive, if the reception of signals is allowed. However, if the signals are inhibited, the process proceeds to step S500.

The sensors 25 and 26 are less likely to act erroneously owing to the vibration of vehicle and electromagnetic noises as well as air flow in the compartment during the period of time from the moment of starting the engine 14 by the remote engine starter function in the guard mode to the moment of stopping the engine. Thus, a highly reliable anti-theft system for vehicles is provided. In such a case the process step S810 corresponds to the process to be performed by the normal operation alarm control of the system.

[Second Embodiment]

Figure 9:
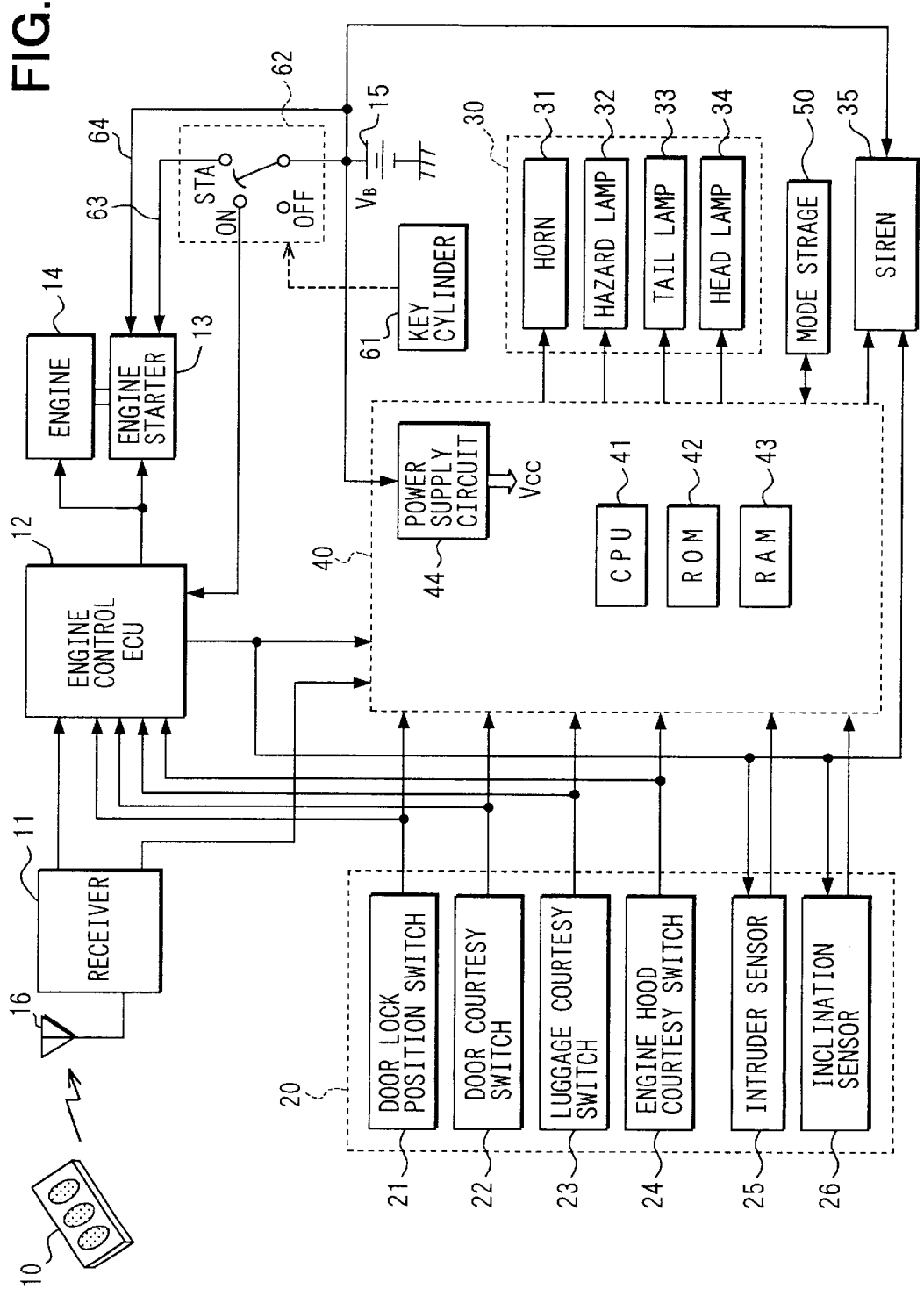
FIG. 9 is a schematic block diagram illustrating an anti-theft system for vehicles according to a second embodiment of the present invention.

The anti-theft system according to the second embodiment is illustrated in FIG. 9. The anti-theft system is similar to the system described in the first embodiment (FIG. 1). However, the arrangement of intruder sensor 25, inclination sensor 26, siren 35, anti-theft management device 90 is somewhat different from the arrangement in the first embodiment. Further, the engine status signal from the engine control ECU 12 is directly input into the sensors 25 and 26 and the siren 35.

The intruder sensor 25 is fundamentally the same as the intruder sensor 25 shown in FIG. 2, and is described with appropriate reference to FIG. 2. The difference from the intruder sensor 25 of the first embodiment is that the engine status signal from the engine control ECU 12 may be input to a port P1 in this embodiment, in opposition to the first embodiment, in which the low- and normal-sensitivity instruction signals from the anti-theft control device 40 are fed to the port P1.

The anti-theft management device 90 of the second embodiment does not issue instructions for lowering (or recovering) the detection sensitivity of the sensors 25 and 26. Therefore, the anti-theft system performs process steps described with reference to FIGS. 4 to 7, except for the process steps S330 and S380 shown in FIG. 5. It should be noted that the sensors 25 and 26 are active and supplied with the sensor driving power from the anti-theft management device 90, if and only if the operation mode is the guard mode.

Figure 10:
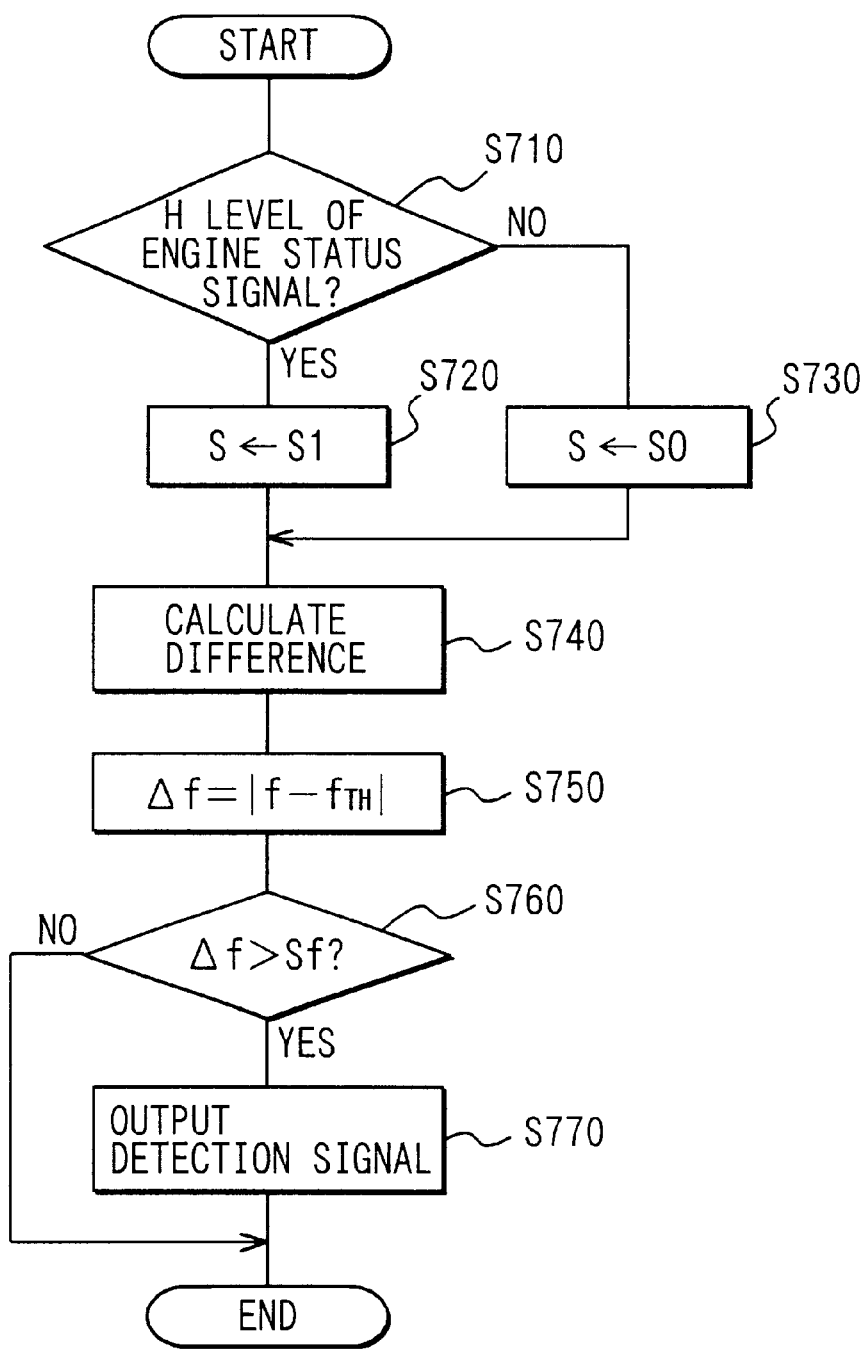
FIG. 10 is a flow diagram illustrating an intruder detecting process performed in the second embodiment.

FIG. 10 shows a flow diagram of intruder detecting process to be performed by the intruder sensor 25. The intruder sensor 25 repeats this intruder detection at a predetermined regular interval. As shown in FIG. 10, at S710, it is checked whether the engine status signal directly input from the engine control ECU 12 is H level. If the signal is L level (indicating that the engine 14 is not running), then the process goes to S730 to set the maximum tolerance S to S0, normal value. If otherwise the signal is H level (indicating that the engine 14 is going to start by means of the remote engine starter function, or is already running), the process proceeds to S720 to set the maximum tolerance S to S1, which is a value larger than S0. In this manner, by setting the maximum tolerance S to a value larger than the normal value S0, a decrease of the detection sensitivity is achieved.

The difference f between the ultrasonic transmission frequency and the ultrasonic reception frequency is calculated, and in the succeeding S750 the difference $\Delta f$ between the difference f and the reference value fTH is calculated. Then at S760, the difference $\Delta f$ is compared with the maximum tolerance S. If $\Delta f \leq S$ indicating that no intruder is present, then the process is terminated. Otherwise, if $\Delta f > S$ indicating that an intruder may be present, then a detection signal to the anti-theft management device 90 is output at S770. Although not described in the first embodiment, the intruder sensor 25 may perform a process similar to that shown in FIG. 10. However in case of the first embodiment, S710 will determine whether or not low-sensitivity instruction signal is applied from the anti-theft control device 40.

The decrease of detection sensitivity in the inclination sensor 26 may be almost the same. Thus, the detection sensitivity can be lowered by means of any methods, such as setting the threshold θ of the inclination to a value larger than normal value for determining whether an abnormal inclination is present when the engine status signal input transits to H level.

The siren 35 is in the same configuration as the siren 35 (FIG. 3) of the preceding first embodiment. However, the engine status signal to the CPU 81 is directly input from the engine control ECU 12. In addition, the siren 35 will perform the alert sound generating process shown in FIG. 7.

As can be appreciated from the foregoing description, the decrease of detection sensitivity of the sensors 25 and 26 is implemented by the sensors 25 and 26 capturing independently the engine status signal from the engine control ECU 12 to lower their own detection sensitivity thereby, instead of outputting low-sensitivity instruction signals to the sensors 25 and 26 from the anti-theft management device 90 based on the engine status signal from the engine control ECU 12. Therefore, the anti-theft system for vehicles may achieve the same effect and function as the anti-theft system for vehicles of the first embodiment.

It should be appreciated by the skilled in the art that the preferred embodiments of the present invention are not limited to the disclosed details and arrangement. Many modification and change can be made without departing from the technical scope of the invention.

For instance, although engine status signal is continuously output (either H or L level) from the engine control ECU 12, signals may be output only when the engine 14 is running. The anti-theft control device 40 may be notified that the engine 14 is running by outputting signals from the anti-theft control device 40 to the engine control ECU 12 each time the anti-theft control device 40 is reset so as for the engine control ECU 12 to reply to the anti-theft control device 40 only when the engine 14 is running.

Furthermore, instead of the mode storage device 50 separately provided apart from the anti-theft control device 40, the anti-theft control device 40 may have a built-in mode storage device 50.

In addition, any other detection and alarm can be devised. For example, the tamper detector device 20 is not to be limited to the switches 21 through 24 and sensors 25 and 26. Rather it may have the capability of detecting an attempt of theft through other actions. The alarm generated by the alarm device 30 may also be configured otherwise. For example, feeding fuel or ignition may be stopped to disable operation of the engine.

The siren 35 may be configured to sound an alarm not only when the battery voltage VB drops, but also when an improper action is detected by the sensors 25 and 26 or switches 21 to 24.

The intruder sensor 25 may be any types of sensors such as radio wave-type or infrared light-type and may be unlimitedly used in the condition that it can detect an intruder and is able to lower the detection sensitivity to a desired level.

Furthermore, the anti-theft system may be applied not only to ordinary vehicles having a gasoline engine or a diesel engine as the motor, but also to any other vehicle including hybrid cars, electric cars, or motorcycles, which are driven by a motor and which is capable of starting the engine with a remote starter function from a remote place.

What is claimed is:

1. An anti-theft system for vehicles, the system being mounted on a vehicle having a remote starter control device for starting an engine in response to a turning-on instruction transmitted from an external transmitter and being initialized by a predetermined operating voltage supplied from a power supply to start a system operation, the system comprising:

an operation mode setting means for setting an operation mode into either one of a guard mode and a guard-free mode in response to an operation of a user;

an operation mode storage means for storing the operation mode;

an alarm generating means for generating an alarm outwardly when an unauthorized operation of a vehicle is detected;

a normal operation alarm control means for operating the alarm generating means if a predetermined unauthorized operation is done when the operation mode is the guard mode;

a starting operation alarm control means for loading the operation mode before initialization stored in the operation mode storage means at the time of starting a system operation and for operating the alarm generating means if the operation mode is the guard mode; and a starting operation alarm inhibiting means for determining whether the remote starter control device is operating and for preventing the alarm generating means from generating the alarm by the starting operation alarm control means if the remote starter control device is determined to be operating at the time of starting the system operation.

2. The anti-theft system as in claim 1, wherein:

the starting operation alarm inhibiting means causes the starting operation alarm control means to prevent the alarm generating means from generating the alarm if the engine is running by the operation of the remote starter control device, even when the remote starter control device has completed its operation at the time of starting the engine.

3. The anti-theft system as in claim 1, further comprising:

an engine running status check means for determining whether the remote starter control device is operating when the operation mode is the guard mode; and an engine running status storing means for storing the status that the engine is running, wherein the starting operation alarm inhibiting means checks whether the remote starter control device is operating based on content stored in the engine running status storing means.

4. The anti-theft system as in claim 3, wherein:

the engine running status storing means retains the stored content until the engine is stopped once the status that the engine is running is stored.

5. The anti-theft system as in claim 1, further comprising an alarm device, wherein the alarm device includes:

a built-in auxiliary memory;

a first storage control means for storing the operation mode set by the operation mode setting means into the built-in auxiliary memory;

an alarm generating means for determining whether an operating voltage falls below a predetermined voltage threshold value and for generating a predetermined alarm sound if the operating voltage falls below the predetermined threshold when the operation mode of the system stored in the built-in auxiliary memory is the guard mode;

an alarm inhibiting means for determining whether the remote starter control device is operating and for inhibiting the alarm sound by the alarm means if the device is determined to be operating.

6. The anti-theft system as in claim 1, further comprising:

an unauthorized operation sensor for detecting any unauthorized operation on the vehicle, wherein the normal operation alarm control means determines a predetermined unauthorized operation if the unauthorized operation is detected by the unauthorized operation sensor, and includes a detection sensitivity reducer means for checking whether the remote starter control device is in operation and reducing detection sensitivity of the unauthorized operation sensor.

7. The anti-theft system as in claim 1, further comprising:

an unauthorized operation sensor for detecting any unauthorized operation on the vehicle, wherein the normal operation alarm control means determines a predetermined unauthorized operation if the unauthorized operation is detected by the unauthorized operation sensor, determines whether the remote starter control device is in operation, and prevents the alarm generating means from generating the alarm even if the unauthorized operation sensor detects the unauthorized operation when the remote starter control device is determined to be in operation.

8. The anti-theft system as in claim 7, wherein:

the normal operation alarm control means prevents the alarm generating means from generating the alarm if the unauthorized operation sensor detects the unauthorized operation during running of the engine by the operation of the remote starter control device even if the remote starter control device has completed its operation.

9. An anti-theft system for vehicles, the system being mounted on a vehicle having a remote starter control device for starting an engine in response to a turning-on instruction transmitted from an external transmitter, the system comprising:

an operation mode setting means for setting an operation mode into either one of a guard mode and a guard-free mode in response to the operation of a user;

an operation mode storage means for storing the operation mode;

an unauthorized operation sensor for detecting any unauthorized operation on the vehicle;

an alarm generating means for generating an alarm outwardly when detecting the unauthorized operation of the vehicle;

an alarm control means for operating the alarm generating means if the unauthorized operation is detected by the unauthorized operation sensor when the operation mode is the guard mode; and a detection sensitivity reducer means for checking whether the remote starter control device is in operation and reducing detection sensitivity of the unauthorized operation sensor if the device is determined to be in operation.

10. The anti-theft system as in claim 9, wherein:

the detection sensitivity reducer means continues to reduce the detection sensitivity of the unauthorized operation sensor as along as the engine is in operation, even when the remote starter control device has stops operating.

11. An anti-theft system for vehicles, the system being mounted on a vehicle having a remote starter control device for starting an engine in response to a turning-on instruction transmitted from an external transmitter, the system comprising:

an operation mode setting means for setting an operation mode into either one of a guard mode or a guard-free mode in response to an operation of a user;

an operation mode storage means for storing the operation mode;

an unauthorized operation sensor for detecting any unauthorized operation on the vehicle;

an alarm generating means for generating an alarm outwardly when the unauthorized operation of the vehicle is detected; and an alarm control means for operating the alarm generating means if the unauthorized operation is detected by the unauthorized operation sensor when the operation mode is the guard mode, wherein the alarm control means checks whether the remote engine starter control device is in operation, and prevents the alarm generating means from generating the alarm if the unauthorized operation sensor detects the unauthorized operation if the remote engine starter control device is determined to be in operation.

12. The anti-theft system as in claim 11, wherein:

the alarm control means prevents the alarm generating means from generating the alarm if the unauthorized operation sensor detects the unauthorized operation during running of the engine by the operation of the remote starter control device even if the remote starter control device has completed its operation.

13. The anti-theft system as in claim 11, wherein:

the unauthorized operation sensor includes an intruder sensor for detecting an intruder attempting to intrude in the vehicle.

* * * * *